Patented Feb. 26, 1952

2,587,268

UNITED STATES PATENT OFFICE 2,587,268

WATER-EMULSIFIABLE METALLIC PASTE PIGMENTS

Wayne B. Roberts, Mount Lebanon, Pa., assignor to Aluminum Company of America, Pittsburgh, Pa., a corporation of Pennsylvania No Drawing. Application November 29, 1949, Serial No. 130,069

7 Claims. (Cl. 106—290)

This invention relates in general to water-emulsifiable, paste pigment formulations, and in particular to such formulations in which the pigment portion is composed of metallic flakes. The invention is primarily concerned with the provision of stable, water-emulsifiable, metallic paste pigments suitable for admixture with water in the manufacture of metallic water paints, inks, and similar coating materials. Although aluminum flakes have been contemplated as the preferred metallic pigment portion of the water-emulsifiable, metallic paste pigment formulations, other metals and their alloys may be substituted therefor.

I have discovered that known water-emulsifiable, metallic paste pigment formulations can be substantially improved in their surface adherence and binding characteristics through the addition of one or more substantially water-free, water-soluble carbohydrates, without affecting the properties of the metallic paste pigment formulations expressed in terms of their paste-retaining consistency and freedom from agglomerate formation under storage conditions sealed against atmosphere.

It is a primary object of the present invention to provide a stable, water-emulsifiable, metallic paste pigment that is characterized by freedom from hardening tendencies and agglomerate formation under storage conditions which exclude the atmosphere.

Another object of the invention is to provide a stable, water-emulsifiable, metallic paste pigment having improved adherence characteristics.

A further object of the invention is to provide a metallic paste pigment composition that is stable in storage, sealed against atmosphere, and only requires admixture with water and stirring to produce a water paint coating material characterized by good adherence on surfaces to which it has been applied.

Another object of the invention is to provide an aluminum paste pigment formulation stable in storage, and useful as a mold wash in contact with molten ferrous metals and alloys.

Other objects and advantages will present themselves to those skilled in the art to which the invention appertains on consideration of the following specification, specific examples, and appended claims.

It has been previously discovered that metallic flake particles, examples of which are aluminum, copper, and alloys thereof, manufactured by either a dry or paste process, can be formulated in water-emulsifiable paste form that responds favorably to packaging and storage, excluding the atmosphere, without developing pressure or hardening. Metallic pastes exhibiting these favorable characteristics have been described and claimed in U. S. applications, Serial No. 43,551, filed August 10, 1948, and Serial No. 61,118, filed November 19, 1948, in both of which I am a co-inventor with Robert I. Wray.

The water-emulsifiable, paste formulations in question referred to in the above applications are generally characterized in their composition as comprising metallic flake, mineral spirits, or other suitable hydrocarbons, at least one grease or lubricant selected from the group consisting of palmitic, stearic, oleic and ricinoleic acid, commercial tall oil, and an emulsifier, with or without the addition of casein as a binder.

By "tall oil" is meant the commercial by-product from the digestion of wood pulp, which normally contains from about 40 to 55 per cent rosin acids, from about 40 to 55 per cent fatty acids, and from about 5 to 10 per cent unsaponifiable material, such as sterols, higher alcohols, hydrocarbons, and the like.

Emulsifiers that have been successfully employed in water-emulsifiable, metallic paste pigment formulations containing casein as a binder are definable in terms of the water-soluble, soap-forming alkalis, selected from the group consisting of the carbonates of sodium, the borates of sodium, morpholine, the ethanolamines and isopropanolamines, which are capable of combining with the fatty acids, and the other organic acids present on the pigment and in the tall oil, to produce effective emulsifying agents when the paste pigment formulations are mixed with water. The water-soluble, soap-forming amino compounds selected from the group consisting of 2-amino-1-butanol, 2-amino-2-methyl-1-propanol, 2 - amino - 2 - methyl - 1,3 - propanediol, the isopropanolamines, the ethanolamines, morpholine and mono-n-butyl amine may be substituted for the above stated water-soluble, soap-forming alkalis in metallic paste formulations in which the casein binder has been omitted.

The tall oil constituent of the water-miscible paste formulations serves to some degree as a binder in water paints prepared therefrom. Small amounts of casein, in those formulations including one or more emulsifiers selected from the above named water-soluble, soap-forming alkalis, also effect a binding action in the final water paint films. Casein, however, exhibits a tendency to mold, and it is preferred to add small amounts of an anti-mold agent, or preservative, such as the borates of sodium, the phenyl-chlorophenols, or mixtures thereof, to water-emulsifiable, metallic paste pigment formulations containing casein.

I have discovered that the binding and adhesion characteristics of water paints made from stable, metallic paste formulations of the type above referred to can be materially improved through the addition of one or more substantially water-free, water-soluble carbohydrates without affecting the stability of the paste compositions during storage, excluding the atmosphere. One or more of the substantially water-free carbohydrates represented by starch, sucrose, dextrose, maltose, lactose, levulose, and equivalent water-soluble, substantially water-free carbohydrates can be readily incorporated in the paste formulations, preferably in a final mixing step before packaging of the same, without in any way introducing deleterious properties in the paste formulations.

Other addition agents in the form of small amounts of free soap, or sodium stearate, have been found to accelerate the dispersibility of the paste pigments in water, and particularly water at room temperature. The further addition of a small amount of a water-soluble silicate, such as one of the alkali metal silicates, has also been found to act as an inhibitor against the generation of gas within sealed containers of the paste formulations. For this purpose I prefer to use sodium disilicate.

No attempt is made to explain the precise chemical phenomena that may take place in the water-emulsifiable, metallic paste formulations or compositions forming the basis of this invention. The theory is advanced, however, that the water-soluble, soap-forming alkalis, and the water-soluble, soap-forming amino compounds, serving as emulsifiers in the paste compositions of the invention, react and/or combine with free or available fatty acid or acids, or mixtures thereof, as well as with the rosin acids, and/or other organic acids present on the metal flakes, in solution, or dispersed in the volatile hydrocarbon and/or associated with the tall oil, to form water-soluble soaps during the subsequent admixture of the paste pigments with water. Regardless of the exact chemistry involved, the water-emulsifiable, metallic paste pigment formulations, falling within the scope of the invention are stable and free from any tendency to harden under storage conditions which exclude free access to atmosphere and moisture.

The final water-emulsifiable paste pigment formulations of the invention are not emulsions as initially formed and are kept as free from water as commercially practicable. However, small amounts of combined water, water of crystallization, and small amounts of sorbed water, may be tolerated in the paste pigment formulations providing the teaching and practice of the invention is followed.

Since the water-emulsifiable paste pigments of the invention are metallic in nature, water mixed paints made therefrom have significant value as mold washes. Water paints made from water-emulsifiable paste pigment formulations, in which the metallic portion is aluminum flake, have proved significantly successful as mold washes for hot cast iron or steel molds, in the casting of ferrous metals, in which case the improved adherence exhibited by metallic paints made from the paste formulations of the invention reduced the surface scab formations on the finished ferrous castings.

The following examples of water-miscible, metallic paste pigment formulations responding to the teaching of the invention were prepared to a standard formula by mixing 605 grams of metallic flake, mineral spirits and a small amount of a fatty acid or mixtures thereof, with 212 grams of tall oil, of which up to 10 per cent may be resinous materials, such as ester gum, 91 grams of a water-soluble, soap-forming emulsifier, of which 45 to 85 per cent may be casein binder, 2 to 10 per cent may be a preservative, 0.1 to 5 per cent may be an inhibitor, 5 to 13 per cent may be free soap, and 652 grams of a substantially water-free, water-soluble carbohydrate, the total weight of the entire formulation in each case being 1560 grams. In the event casein is present in the paste formulation, it is preferred to also include the preservative, inhibitor and free soap within the ranges stated above.

*Example I*

A water-emulsifiable, aluminum paste pigment formulation was prepared in the above stated proportions by a single mixing operation, and on conversion to percentage composition by weight, the paste formulation comprised 30.5 per cent aluminum flake, 7.72 per cent mineral spirits, 0.58 per cent stearic acid, as determined in the initial aluminum paste cake containing mineral spirits, 13.7 per cent tall oil, 3.7 per cent casein, 0.7 per cent sodium carbonate, 0.56 per cent sodium bicarbonate, 0.362 per cent borax, 0.415 per cent sodium stearate, or soap, 0.063 per cent sodium silicate, and 41.7 per cent starch. The paste formulation exhibited good stability following several months' storage in sealed containers, retaining its original paste consistency without any evidence of hardening, and was free from agglomerates. When mixed with water at room temperature, as well as with hot water between 130 to 150° F., in amounts of 6 grams of paste to 25 cc. water, the paste readily emulsified and dispersed in the water to form a free flowing water paint that was brushed on paper and metal panels with good results, as measured in terms of paint film adhesion and hiding power. When employed as a mold wash in the casting of steel ingots, the water paint film made by employing the pigment formulation of this example exhibited adhesion characteristics superior to those of a similar paste composition without the carbohydrate starch addition.

*Example II*

A similarly prepared paste pigment, in which the starch was replaced in equal amount by sucrose, preferably powdered granulated sugar, gave comparable results to that of Example I.

*Example III*

A third aluminum paste pigment formulation made in accordance with the invention comprised 30.5 per cent aluminum flake, 7.72 per cent mineral spirits, 0.58 per cent stearic acid on the flake and in the mineral spirits, 13.7 per cent tall oil, 3.7 per cent casein, 0.7 per cent sodium carbonate, 0.56 per cent sodium bicarbonate, 0.362 per cent borax, 0.415 per cent sodium stearate, 0.063 per cent sodium disilicate, 20.85 per cent starch, and 20.85 per cent sucrose in the form of powdered granulated sugar. The paste pigment and water paints made therefrom were similar in their characteristics to those of Examples I and II.

Example IV

This example was prepared under the general formula expressed in the previous examples and its composition by weight was 30.5 per cent aluminum flake, 7.72 per cent mineral spirits, 0.58 per cent mixture of stearic and palmitic acids, 13.7 per cent tall oil, 3.98 per cent casein, 1.73 per cent mixture of isopropanolamines, 0.03 per cent sodium silicate, 0.06 per cent sodium stearate, or soap, and 41.7 per cent starch. The paste retained its consistency on sealed storage and was readily emulsified in hot water, at temperatures between 130 to 150° F., to form satisfactory water type paints.

Example V

This example of a water-miscible paste formulation falling within the concept of the invention was made from an initial aluminum flake paste cake which was produced using a non-leafing type lubricant, specifically oleic acid. The composition by weight of this paste was 30.78 per cent aluminum flake, 7.72 per cent mineral spirits, 0.3 per cent oleic acid, 13.7 per cent tall oil, 5.8 per cent 2-amino-2-methyl-1-propanol and 41.7 per cent starch. The paste formulation retained its consistency and remained stable on storage in sealed containers. Water paint made therefrom brushed out satisfactorily producing a typical metallic aluminum surface, with slightly better dispersion and hiding power exhibited when the paste formulation was mixed with water at room temperature, as distinguished from hot water.

Example VI

A paste formulation having the approximate composition by weight, 30.5 per cent aluminum flake, 7.72 per cent mineral spirits, 0.58 per cent stearic acid, 12.33 per cent tall oil, 1.37 per cent ester gum, 5.8 per cent triethanolamine and 41.7 per cent sucrose was prepared by simple mixing of the named ingredients. The paste pigment was emulsifiable in hot and room temperature water, and brush outs of the water paints exhibited good adherence, hiding power, metallic gloss and reflectivity.

Example VII

A water-emulsifiable, copper paste pigment formulation was prepared in accordance with the invention to a composition by weight, 31.5 per cent copper flake, 6.15 per cent mineral spirits, 1.15 per cent stearic acid, as determined in the initial copper paste cake containing mineral spirits, 13.7 per cent tall oil, 3.7 per cent casein, 0.7 per cent sodium carbonate, 0.56 per cent sodium bicarbonate, 0.362 per cent borax, present as an anti-mold agent, 0.063 per cent silicate, 0.415 per cent sodium stearate, or soap, and 41.7 per cent starch. The paste pigment dispersed readily in hot water, as well as in water at room temperature, in amounts of 12 grams of paste to 25 c.c. water to form free flowing water paints that brushed on paper and steel panels with good results to produce dried paint films exhibiting good adherence, hiding power and characteristic metallic copper coatings.

The specific amounts of the various ingredients of the water-emulsifiable, metallic paste pigment formulations given in the above examples may be varied within wide limits. A commercially practicable range for the various ingredients that has been found economical, but not limiting, can be stated in terms of mixtures having the approximate compositions by weight, 23 to 45 per cent metallic flake cake, or paste, containing 3 to 12 per cent mineral spirits, or equivalent volatile hydrocarbons, and 0.15 to 2 per cent of at least one of the fatty acids from the group stearic, palmitic, oleic and ricinoleic acids; in admixture with 2 to 10 per cent of at least one water-soluble, soap-forming emulsifier, and a substantially water-free, water-soluble carbohydrate, or mixtures thereof, in amounts between 15 to 50 per cent, with the balance substantially tall oil, with up to 10 per cent of its weight resinous oil, or material such as ester gum.

The tall oil, and/or ester gum content of the paste pigment formulations of the invention, is preferably present in amounts between 9 to 26 per cent of the total weight of the metallic paste pigment formulations.

Variations in the amounts of the several ingredients and any particular selection of the equivalents in a specific paste formulation will have a bearing upon whether hot or cold water should be employed in the final water paint mixture. In any case, hot or warm water between 130° and 150° F. normally hastens the mixing time in any particular instance. In the case of paste formulations containing the carbohydrate starch, the entire water paint mixture made therefrom may be heated to between 150 and 180° F. for from 5 to 15 minutes. This tends to further improve the adhesion of the paint films.

Commercial tall oil has been referred to and employed in all of the examples, with the exception of Example VI, in which case 10 per cent by weight of the tall oil has been replaced by ester gum, as the major portion of the liquid phase of the metallic paste pigment formulations of this invention. By the term, the "balance substantially tall oil," wherever used, is meant commercial tall oil with additions of other compatible resinous oils.

What is claimed is:

1. A water-emulsifiable, aluminum paste pigment formulation for subsequent admixture with water to form a mold wash in ferrous casting operations, said formulation comprising 30.5 per cent aluminum flake, 7.72 per cent mineral spirits, 0.58 per cent stearic acid, 13.7 per cent tall oil, 3.7 per cent casein, 0.7 per cent sodium carbonate, 0.56 per cent sodium bicarbonate, 0.362 per cent borax, 0.415 per cent sodium stearate, 0.063 per cent sodium silicate, and 41.7 per cent starch, said formulation being characterized by its paste-retaining consistency and freedom from agglomerate formation under storage conditions sealed against atmosphere.

2. A water-emulsifiable, metallic paste pigment formulation comprising 23 to 45 per cent metal flake, 3 to 12 per cent volatile hydrocarbon, at least one fatty acid in amounts between 0.15 and 2 per cent selected from the group consisting of stearic, palmitic, oleic and ricinoleic acids, in admixture with 9 to 26 per cent tall oil, at least one water-soluble, soap-forming emulsifier in amounts between 2 to 10 per cent selected from the group consisting of carbonates of sodium, borates of sodium, the isopropanolamines, the ethanolamines and morpholine, and 45 to 85 per cent of the emulsifier present being casein, and at least one substantially water-free, water-soluble carbohydrate in amounts between 15 to 50 per cent selected from the group consisting of starch, sucrose, dextrose, maltose, lactose and levulose, said metallic paste pigment formulation being characterized by its stability, paste-retaining consistency and freedom from agglomerate formation under storage conditions sealed against atmosphere.

3. A water-emulsifiable, metallic paste pigment formulation comprising 23 to 45 per cent metal flake, 3 to 12 per cent volatile hydrocarbon, at least one fatty acid in amounts between 0.15 and 2 per cent selected from the group consisting of stearic, palmitic, oleic and ricinoleic acids, in admixture with 9 to 26 per cent tall oil, at least one water-soluble, soap-forming emulsifier in amounts between 2 to 10 per cent selected from the group consisting of amino compounds 2-amino-1-butanol, 2-amino-2-methyl-1-propanol, 2-amino-2-methyl-1,3-propanediol, the isopropanolamines, the ethanolamines, morpholine and mono-n-butyl amine, and at least one substantially water-free, water-soluble carbohydrate in amounts between 15 to 50 per cent selected from the group consisting of starch, sucrose, dextrose, maltose, lactose and levulose, said metallic paste pigment formulation being characterized by its stability, paste-retaining consistency and freedom from agglomerate formation under storage conditions sealed against atmosphere.

4. A water-emulsifiable, aluminum paste pigment formulation comprising 23 to 45 per cent aluminum flake, 3 to 12 per cent volatile hydrocarbon, at least one fatty acid in amounts between 0.15 and 2 per cent selected from the group consisting of stearic, palmitic, oleic and ricinoleic acids, in admixture with 9 to 26 per cent tall oil, at least one water-soluble, soap-forming emulsifier in amounts between 2 to 10 per cent selected from the group consisting of carbonates of sodium, borates of sodium, is isopropanolamines, the ethanolamines and morpholine, and 45 to 85 per cent of the emulsifier present being casein, and at least one substantially water-free, water-soluble carbohydrate in amounts between 15 to 50 per cent selected from the group consisting of starch, sucrose, dextrose, maltose, lactose and levulose, said aluminum paste pigment formulation being characterized by its stability, paste-retaining consistency and freedom from agglomerate formation under storage conditions sealed against atmosphere.

5. A water-emulsifiable, aluminum paste pigment formulation comprising 23 to 45 per cent aluminum flake, 3 to 12 per cent volatile hydrocarbon, at least one fatty acid in amounts between 0.15 and 2 per cent selected from the group consisting of stearic, palmitic, oleic and ricinoleic acids, in admixture with 9 to 26 per cent tall oil, at least one water-soluble, soap-forming emulsifier in amounts between 2 to 10 per cent selected from the group consisting of amino compounds 2-amino-1-butanol, 2-amino-2-methyl-1-propanol, 2-amino-2-methyl-1,3-propanediol, the isopropanolamines, the ethanolamines, morpholine and mono-n-butyl amine, and at least one substantially water-free, water-soluble carbohydrate in amounts between 15 to 50 per cent selected from the group consisting of starch, sucrose, dextrose, maltose, lactose and levulose, said aluminum paste pigment formulation being characterized by its stability, paste-retaining consistency and freedom from agglomerate formation under storage conditions sealed against atmosphere.

6. A water-emulsifiable, aluminum paste pigment formulation comprising a mixture of 23 to 45 per cent aluminum flake, 3 to 12 per cent volatile hydrocarbon, at least one fatty acid in amounts between 0.15 and 2 per cent selected from the group consisting of carbonates of sodium, borates of sodium, the isopropanolamines, from the group consisting of stearic, palmitic, oleic and ricinoleic acids, at least one water-soluble, soap-forming emulsifier in amounts between 2 to 10 per cent selected from the group consisting of carbonates of sodium, borates of sodium, the isopropanolamines, the ethanolamines and morpholine, of which 45 to 85 per cent of the emulsifier present is casein binder, 2 to 10 per cent of the emulsifier present is borax preservative, 0.1 to 5 per cent of the emulsifier present is water-soluble silicate inhibitor and 5 to 13 per cent of the emulsifier present is free soap, at least one substantially water-free, water-soluble carbohydrate in amounts between 15 to 50 per cent selected from the group consisting of starch, sucrose, dextrose, maltose, lactose and levulose, and the balance substantially tall oil, said aluminum paste pigment formulation being characterized by its stability, paste-retaining consistency and freedom from agglomerate formation under storage conditions sealed against atmosphere.

7. A water-emulsifiable, copper paste pigment formulation for subsequent admixture with water to form a copper base coating paint, said formulation comprising 31.5 per cent copper flake, 6.15 per cent mineral spirits, 1.15 per cent stearic acid, 13.7 per cent tall oil, 3.7 per cent casein, 0.7 per cent sodium carbonate, 0.56 per cent sodium bicarbonate, 0.362 per cent borax, 0.063 per cent silicate, 0.415 per cent sodium stearate, and 41.7 per cent starch, said formulation being characterized by its paste-retaining consistency and freedom from agglomerate formation under storage conditions sealed against atmosphere.

WAYNE B. ROBERTS.

REFERENCES CITED

The following references are of record in the file of this patent:

UNITED STATES PATENTS

| Number | Name | Date |
| --- | --- | --- |
| 2,002,891 | Hall | May 28, 1935 |
| 2,362,884 | Clark | Nov. 14, 1944 |
| 2,401,666 | Schmidt | June 4, 1946 |
| 2,450,072 | Zavaleta | Sept. 28, 1948 |